United States Patent [19]
Carey et al.

[11] Patent Number: 5,539,451
[45] Date of Patent: Jul. 23, 1996

[54] METHOD AND APPARATUS FOR CHANNEL SPINNING OFF A CHANNEL

[75] Inventors: John T. Carey, Dobbs Ferry, N.Y.; Barbara A. Taylor, Denville, N.J.

[73] Assignee: AT&T Corp., Murray Hill, N.J.

[21] Appl. No.: 364,628

[22] Filed: Dec. 27, 1994

[51] Int. Cl.⁶ .................................................. H04N 7/173
[52] U.S. Cl. ................................ 348/12; 348/13; 455/6.2
[58] Field of Search ............................. 348/11, 12, 13, 348/906, 10, 7, 6, 723, 722; 455/4.2, 6.2; H04N 7/173

[56] References Cited

U.S. PATENT DOCUMENTS

| | | | |
|---|---|---|---|
| 4,908,859 | 3/1990 | Bennett et al. | 348/13 |
| 5,206,722 | 4/1993 | Kwan | 455/6.2 X |
| 5,226,904 | 1/1994 | Mutzig et al. | 455/6.2 X |
| 5,359,601 | 10/1994 | Wasilewski et al. | 348/906 |
| 5,418,559 | 5/1995 | Blahut | 455/6.2 X |
| 5,440,490 | 8/1995 | Blahut et al. | 455/6.2 X |

*Primary Examiner*—Victor R. Kostak
*Attorney, Agent, or Firm*—David M. Rosenblatt; Vernon E. Williams

[57] ABSTRACT

A method and an apparatus for spinning off a channel so as to provide a viewer with a choice of viewing a first program (e.g., the TV program), a second program (e.g., a news brief), or both are disclosed. More specifically, a method for providing such a choice entails initially having a system for transmitting programs wherein a first program is being transmitted on a first channel to a set of subscriber stations. Next, a temporary channel is defined. The transmission of the first program is continued on the temporary channel. The transmission of the first program is discontinued on the first channel. A second program is transmitted on the first channel. Advantageously, the invention provides viewers with a programming choice not otherwise available.

31 Claims, 3 Drawing Sheets

METHOD AND APPARATUS FOR CHANNEL SPINNING OFF A CHANNEL

FIELD OF THE INVENTION

The present invention relates to television. More specifically, the present invention relates to interactive television as a means for providing viewing choice of at least two channels, one of which is a temporary channel, to a viewer.

BACKGROUND OF THE INVENTION

Many of us, if not all of us, have experienced a scenario similar to the following scenario. First, you sit down and tune your TV to a first channel to watch a TV program. Next, the TV program begins. Suddenly, the TV program is interrupted by a second TV program, for example, a news brief. During the news brief, of course, you, the viewer, do not have the option of continuing to view the first program.

The above scenario results in frustration due to you having no control over what TV programs you are allowed to watch. For example, sometimes, after the news brief, the TV program is simply joined in progress. This is particularly true if the TV program is a live event such as a sporting event. This results in the you missing at least a portion of the TV program that you wanted to watch. Other times, the TV program is joined at the exact point where it was left when the news brief began. This is a method that is particularly useful with prerecorded shows such as movies. Although this method does allow you to view the TV program in its entirety, the fact that the TV program is interrupted and may disrupt your schedule may be a cause of frustration.

SUMMARY OF THE INVENTION

We have invented a method of and apparatus for creating an extra channel so as to provide a viewer with a choice of viewing a first program (e.g., the TV program), a second program (e.g., a news brief), or both. An illustrative method for providing such a choice entails initially having a system for transmitting programs wherein a first program is being transmitted on a first channel to a set of subscriber stations. Next, a temporary channel is defined. The transmission of the first program is continued on the temporary channel. The transmission of the first program is discontinued on the first channel. A second program is transmitted on the first channel.

Advantageously, an embodiment of the invention provides viewers with a programming choice not otherwise available.

Also advantageously, an embodiment of the invention is capable of informing viewers about the temporary channel that has been provided.

Also advantageously, an embodiment of the invention is capable of storing user defined profiles ("profiles") which predetermine which program to view (e.g., with picture-in-picture TV sets, one could view both the first program and the second program).

Also advantageously, an embodiment of the invention is capable of storing profiles such that, if desired, the viewer will be able to view during, e.g., certain time periods, the first program in a manner which is uninterrupted and transparent to the viewer even though the extra channel has been created.

Also advantageously, the profiles may be used to ensure that the spin-off feature does not interrupt programs that are being recorded.

Other advantages of the present invention will be apparent from the "Detailed Description" and the remainder of the specification.

DETAILED DESCRIPTION

The present invention will be described in an ITV environment. U.S. patent application Ser. No. 07/965,492 entitled "Interactive Television Converter" filed Oct. 23, 1992 and assigned to the assignee of the present invention is incorporated herein by reference, as if set forth in its entirety. Also incorporated herein by reference as if set forth in their entirety are: U.S. patent application Ser. No. 08/029205 entitled "Method And Apparatus For The Coding And Display Of Overlapping Windows With Transparency" filed Mar. 10, 1993; U.S. patent application Ser. No. 07/965493 entitled "Interactive Television Multicasting" filed Oct. 23, 1992; U.S. patent application Ser. No. 07/965463 entitled "Initializing Terminals In A Signal Distribution System" filed Oct. 23, 1992; U.S. patent application Ser. No. 07/997985 entitled "Program Server For Interactive Television System" filed Dec. 28, 1992; U.S. patent application Ser. No. 08/056973 entitled "Integrated Television Services System" filed May 3, 1993; U.S. patent application Ser. No. 08/056974 entitled "System For Composing Multimedia Signals For Interactive Television Services" filed May 3, 1993; and U.S. patent application Ser. No. 08/175059 entitled "Method Of Controlling Multiple Processes Using Finite State Machines" filed Dec. 29, 1993, all of which are assigned to the assignee of the present invention.

For clarity of explanation, the illustrative embodiments of the present invention are described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software.

Figure 1:
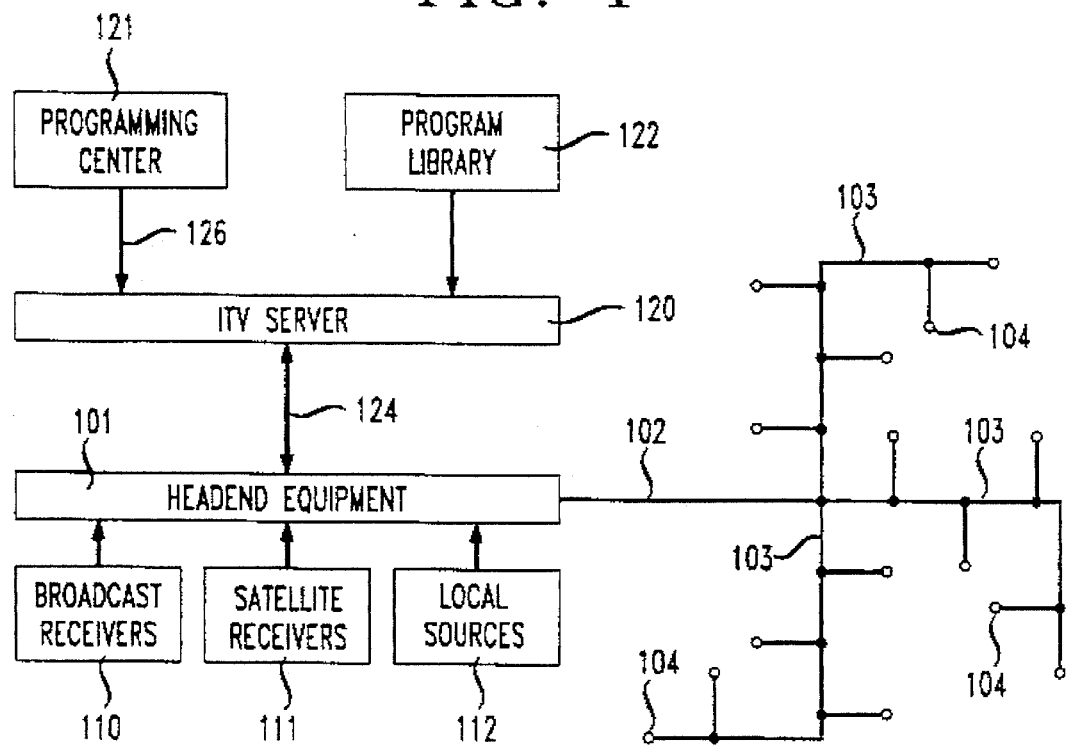
FIG. 1 is a diagram of an interactive television ("ITV") system.

FIG. 1 shows an ITV system. Headend equipment 101, feeders 102, branches 103, a set of subscriber locations 104, broadcast receivers 110, satellite receivers 111, local sources 112, an ITV server 120, a programming center 121, and a program library 122 are all connected as shown. A more detailed description of the interrelationship between the various above-mentioned elements is found in above cited U.S. patent application Ser. No. 07/965493 on page 4, line 1 through page 5, line 14.

Figure 2:
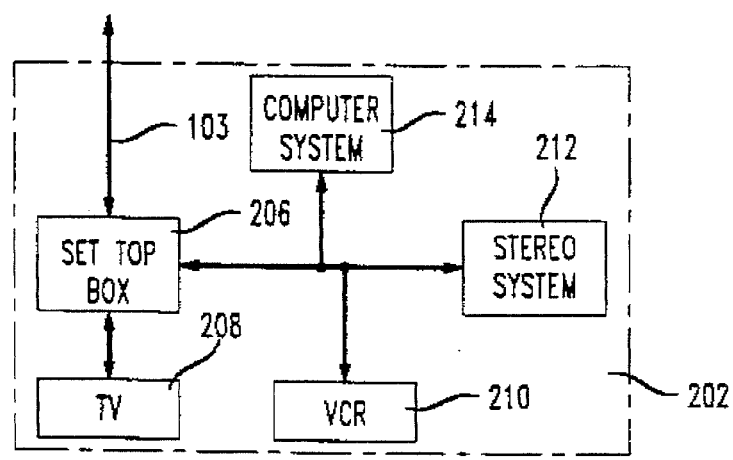
FIG. 2 is a diagram of a particular subscriber location of the ITV system of FIG. 1.

FIG. 2 shows a particular subscriber station 202 in a set of subscriber stations 104. The particular subscriber station 202 comprises a set top box 206, a television 208 ("TV"), a videocassette recorder 210 ("VCR"), a stereo system 212, and a computer system 214 connected as shown. Those skilled in the art will appreciate that there are numerous different configurations that are possible due to the different sets of equipment that may be the particular subscriber station. In fact, even within the particular subscriber station 202 shown, there are numerous interconnection possibilities including but not limited to coupling the VCR 210 to the TV 208, the VCR 210 to the stereo system 212, and/or the TV 208 to the stereo system 212.

An embodiment of the structure and operation of the present invention will now be described with reference to FIGS. 3 and 4, respectively. The description will be made from the point of view of the environment of FIGS. 1 and 2.

Figure 3:
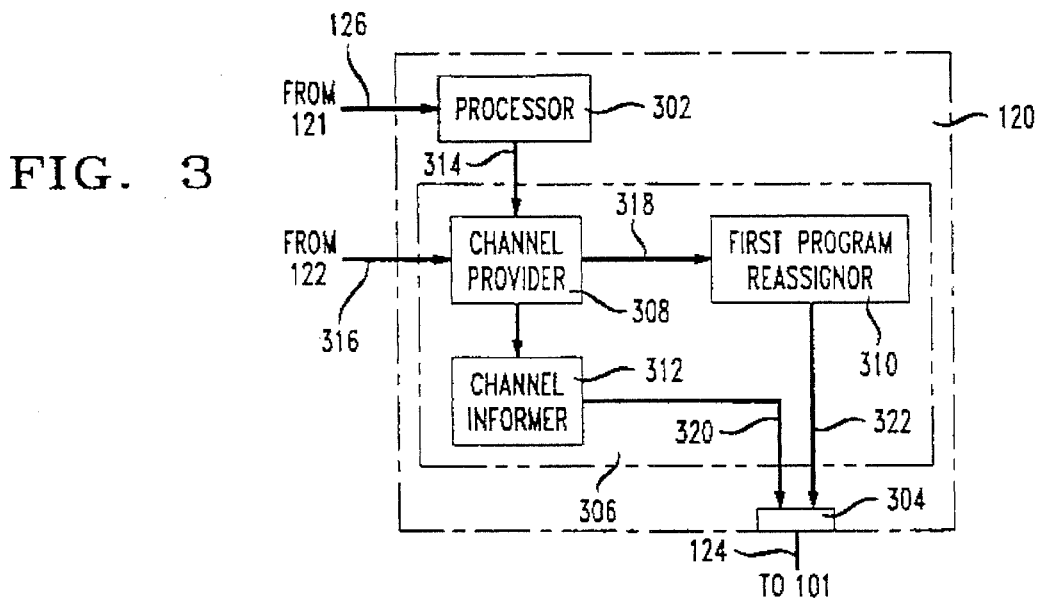
FIG. 3 is a diagram of a portion of the server of the portion of the ITV system of FIG. 1.

Referring to FIG. 3, the server 120 is comprised of a processor 302 that may be used to create an extra channel. The extra channel is a temporary channel. Typically, the server 120 obtains its programming material from such sources as the programming center 121 and/or the programming library 122. The program library comprises stored data that may include, e.g., versions of movies, musical selections, text, pictorial information, and other material that may be accessed by a subscriber location 104. A more detailed description of the server is found in above cited U.S. patent application Ser. No. 07/997985.

Again referring to FIG. 3, the processor 302 may process, e.g., a version of a movie and transmit it to a viewer over a communications link 124 which connects the server 120 to the headend equipment 101 (see FIG. 1). An output port 304 in the server 120 that connects to the communications link 124 serves to transmit a first program (e.g., the version of the movie).

Yet again referring to FIG. 3, the processor 302, while showing the first program on a first channel, receives a command to show a second program, e.g., a news brief, on the first channel. This command comes from a communications link 126 that links the programming center 121 to the server 120. In response to this command, the server 120 defines a temporary channel via block 306. The temporary channel is considered "temporary" because the length of time during which the temporary channel is defined is a function of the length of the second program. That is, the extra channel is "temporary" in the sense that the second program is "temporary." For example, if the second program is a news brief that will last fifteen minutes, the temporary channel may be defined for slightly more than fifteen minutes. This time would be used to provide the fifteen minute news brief and also be used to handle any overhead communications needs (e.g., channel set up time, etc.). Illustratively, both the first channel and the temporary channel are virtual channels.

Once the second program is complete, there is no longer a need for both the temporary channel and the first channel. Thus, one may continue transmission of the first program on the first channel and stop the transmission of the first program on the temporary channel. Further, since there is no longer a program to transmit on the temporary channel, the temporary channel may be eliminated. In this situation, the set of subscriber stations that were tuned to the temporary channel should be informed that the first program is being continued (or will be continued in a predetermined amount of time) on the first channel.

Still referring to FIG. 3, block 306 is comprised of a channel provider 308, a first program reassignor 310, and a channel informer 312 connected as shown. In order to show a news brief on the first channel, the channel provider 308 receives a signal on line 314 from the processor 302 instructing the channel provider 308 to provide a temporary channel onto which a signal from line 316 (the line inputting the first program to the server) will be placed. The channel provider 308 instructs the first program reassignor 310, via line 318, to reassign the first program to the temporary channel. Also, the signal on line 314 instructs the channel provider 308 to have the channel informer 312 insert a message in the first channel that will inform viewers that the first program is now being shown on the temporary channel. A signal on line 320 represents the second program (with the information from the channel informer 312 inserted therein). A signal on line 322 represents the first program that has been reassigned to the temporary channel. The signal on line 320 and the signal on line 322 are sent into the output port 304 for transmission to the headend equipment 101. The headend equipment 101 eventually makes available the first program and the second program to appropriate subscriber locations 104 via feeders 102 and branches 103.

Figure 4:
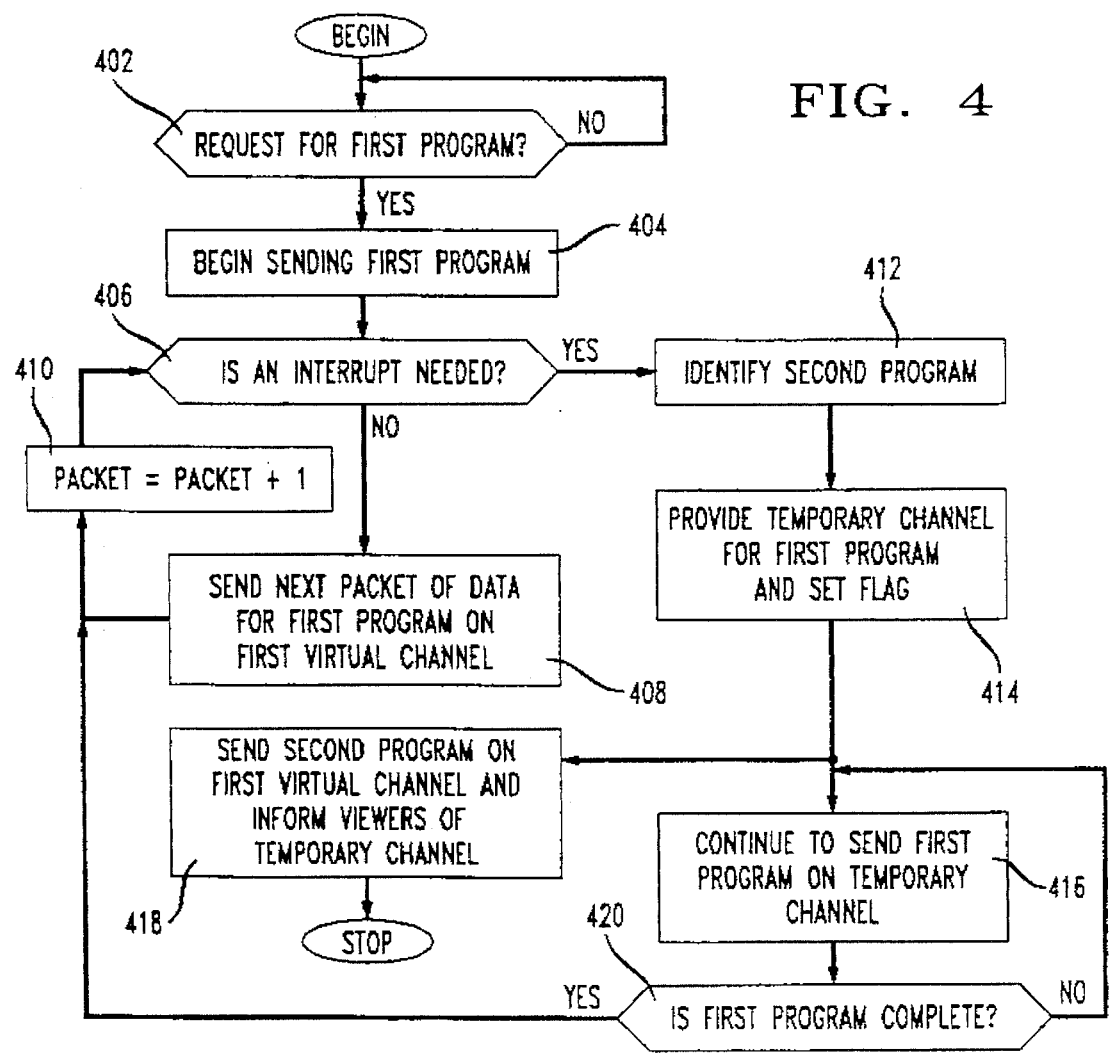
FIG. 4 is a flowchart showing the operation of the server when a channel is spun-off.

Referring to FIG. 4, the process of "spinning off" a channel is shown. Prior to describing the process of "spinning off" a channel, it should be made clear that the process results in the temporary or extra channel. In terms of the process, initially, there is a request for the first program as shown in box 402. If the first program is, for instance, a digital program, the first program may be represented by a set of packets. In response to the request, the server 120, in conjunction with other equipment such as the headend equipment 101, begins to transmit the first program. This may be done by sending a first packet of information (e.g., data) as shown in box 404. As shown in boxes 406, 408, and 410, additional packets of information are sent provided that an interrupt is not encountered. Those skilled in the art will appreciate that box 406 need not be represented by a line of code (or lines of code) but may be implemented in hardware. Thus, although the server must be able to detect and process interrupts, the manner in which interrupts are detected and processed may vary.

Again referring to FIG. 4, if no interrupt is encountered, packets of information will be sent in accordance with box 408 until the first program is finished. Thus, only one channel is used.

Still referring to FIG. 4, if an interrupt is encountered, the second program will be identified in accordance with box 412. Next, the temporary channel will be provided in accordance with box 414. The server 120 will continue to send packets of information representing the first program in accordance with box 416. However, these packets will be sent on the temporary channel as opposed to the first channel. Thus, the first program has been "spun-off." It should be noted that box 416 should contain a counter for the packet number similar, if not identical, to the counter shown in box 410. Additionally, the server 120 will begin sending packets of information representing the second program in accordance with box 418. This is done in response to a flag that is set in box 414. Also in accordance with box 418, the first channel will contain information (e.g., a message that appears at the bottom of a TV screen when the packets of information are decoded and displayed) informing viewers that the first program is being shown on the temporary channel. Once the second program is complete, the first program, if incomplete, may be switched back to being shown on the first channel. This is shown, in part, in box 420. Those skilled in the art will appreciate that box 420 need not be represented by a line of code (or lines of code) but may be implemented in hardware. Thus, although the server must be able to detect completion of the first program, the manner in which completion of the first program is detected may vary.

Figure 5:
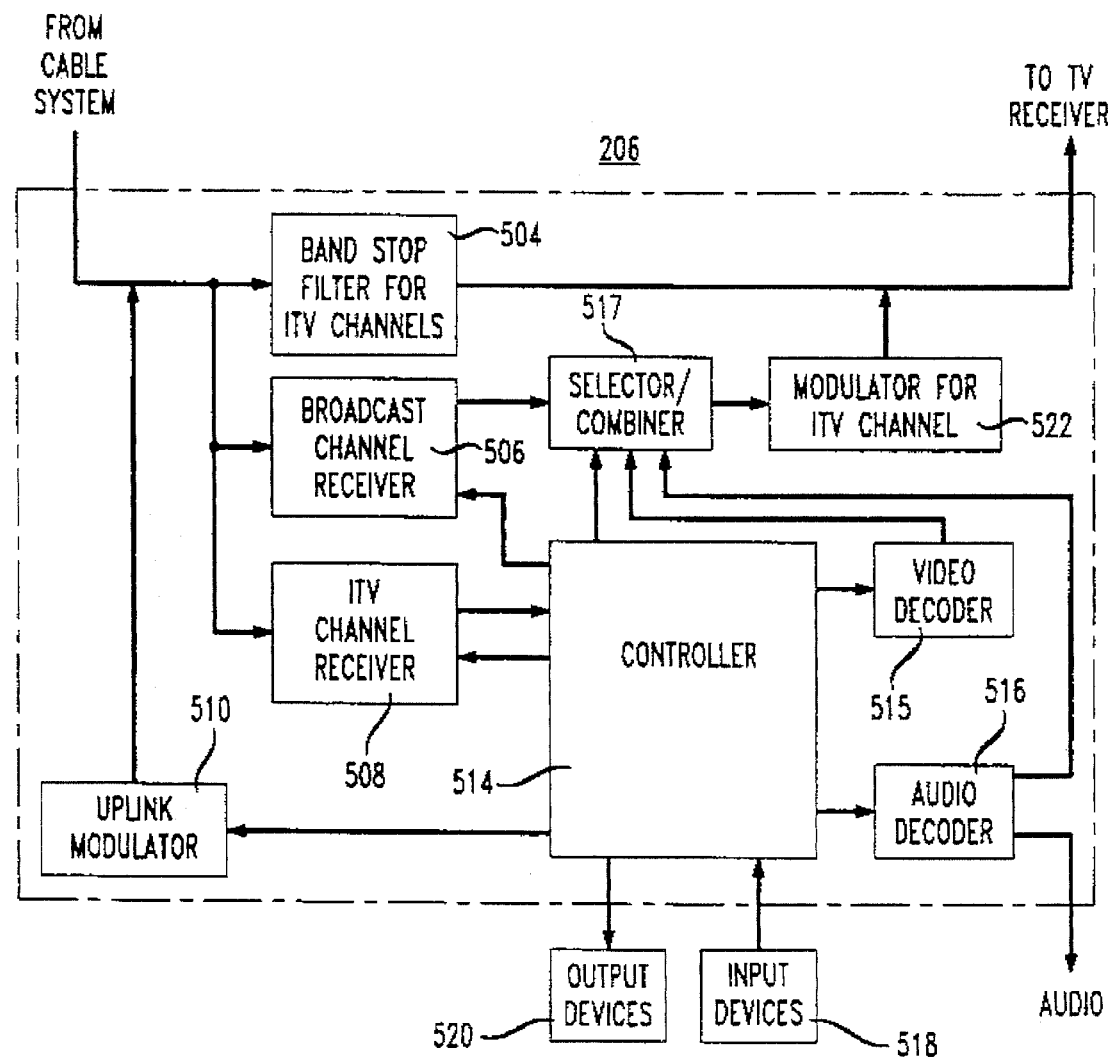
FIG. 5 is a block diagram of the set top box (e.g., converter) shown in FIG. 2.

Referring to FIG. 5, a more detailed view of the set top box 206 of FIG. 2 is shown. The structure and operation of FIG. 5 are described in detail in above-cited U.S. patent application Ser. No. 07/965,492 on at least page 5, line 1 through page 7, line 25. The controller 514 is described as having both random access memory and read only memory. A user defined profile ("the profile") is stored in the RAM of the controller 514 of the set top box 206. In this manner, the user may update/modify the profile depending, e.g., upon what the user will watch during the day/week/month, etc. . . . The controller 514 also provides the ability to automatically transfer a selected channel from a first channel to a temporary channel if a first program is spun-off from the first channel to the temporary channel. The controller 514 would determine if and when to automatically transfer based upon the profile. Thus, the profile would be accessed to determine if the viewer desires channel spin-off.

As an example of use of the profile, suppose a viewer always desires to receive late breaking news unless the viewer is watching TV on Sunday afternoon between the hours of 1:00 p.m. and 7:00 p.m. The viewer enters data that informs the ITV system that if a channel being viewed during this time period is spun-off, the viewers channel should be automatically changed to the temporary channel so as to provide the viewer with uninterrupted viewing of the program. In this case and others, the viewer may wish to have the news brief stored for replay at a later time.

Storage of the profile is advantageous in other manners. For example, profiles entered by a viewer may be used to ensure that VCRs will record what they were programmed to record. In a basic form, this may be accomplished by a viewer by simply inserting the times and dates of all programs to be recorded into the "profile." Thus, even if the program being recorded is spun-off, the system accounts for this by automatically changing to the temporary channel. Further, profiles may be entered in accordance with certain channels as opposed to certain time. In this manner, a viewer's channel may be automatically changed if the first channel is a preselected channel. Also, while the profile has been described as being stored in the RAM of the set top box 206, those skilled in the art will realize that the profile could easily be stored in the server 120 or other location. Further, the profile of viewers whose TV sets have picture-in-picture ("PIP") capability could specify that the first program be shown in a box that is a small portion of the TV screen and the second program be shown in a large portion of the TV screen, or vice versa (as is commonly done in PIP TV sets today). Additionally, a profile could specify that the first program be recorded while the second program is viewed, or vice versa. This could be accomplished by, e.g., having an infrared transmitter in the set top box 106 that communicates with a VCR to turn the VCR on and start recording either the first channel or the temporary channel. The infrared transmitter would use conventional technology known to those skilled in the art. Alternatively, the communications between the set top box 106 and the VCR may be hard wired (e.g., a coaxial cable). Further, the profile could combine PIP features with recording features such that a viewer watches the first program and the second program using the PIP feature and also records either the first program or the second program at the same time.

Those skilled in the art will realize that there are many modifications that one could make to the embodiments described above. For example, the first program could continue to be transmitted on the first channel. In this case, the second program would be shown on the temporary channel. Viewers of the first channel could be informed that the temporary channel may be of interest to the viewers with a message such as "Please turn to channel 57 for late breaking news." Also, viewers could be prompted as to their choice of channels. For instance, if the first program is spun-off onto the temporary channel, there could be a prompt that states, e.g., "Press here to continue watching [first program name]." If a viewer does, in fact, direct an uplink signal in such an area, the system would switch to the temporary channel automatically. Otherwise, the viewer would simply continue viewing the first channel. Additionally, though the first channel and temporary channel may both be virtual channels, the invention may be utilized in an environment in which only one of the channels is a virtual channel. Still further, if an interrupt is encountered and the second program is complete, the first program could continue to be shown on the temporary channel (as opposed to switching back to the first channel as shown in FIG. 4). Further, the structure and operation of the present invention as described with reference to FIGS. 3 and 4, respectively, need not reside only in the server 120. The structure used to execute the described operations of FIG. 4 may be in the headend equipment 101 or the server 120 and headend equipment 101. Also, although the length of time during which the temporary channel is defined is a function of the length of time of the second program, the temporary channel may be used more than once. For example, once the second program ends and the temporary channel is eliminated, it is possible to use the temporary channel again. This situation may arise if one were to have, e.g., two different news briefs. Finally, the second program may be shown in response to a subscriber request. In other words, a subscriber may be watching a commercial and request additional information about a product and/or service via a "hot button." The systems response to this would be to spin-off a channel, enabling the subscriber to receive additional information and also enabling other subscribers to continue viewing the first program. Those skilled in the art will appreciate many other modifications that may be made to the present invention. Thus, the modifications and environments described above, in addition to other modifications and environments, may be implemented without departing from the scope of the claims.

What we claim is:

1. A method for use in a system for transmitting programs wherein a first program is being transmitted on a first channel to a set of one or more subscriber stations, the method comprising:

defining a temporary channel;

continuing transmission of the first program on the temporary channel;

discontinuing transmission of the first program on the first channel; and transmitting a second program on the first channel.

2. The method of claim 1 further comprising informing the set of subscriber stations that the first program is associated with the temporary channel.

3. The method of claim 2 wherein informing the set of subscriber stations that the first program is associated with the temporary channel comprises informing the set of subscriber stations that the first program is being continued on the temporary channel.

4. The method of claim 2 wherein informing the set of subscriber stations that the first program is associated with the temporary channel comprises informing the set of subscriber stations that the first program will be continued on the temporary channel in a predetermined amount of time.

5. The method of claim 2 wherein informing the set of subscriber stations that the first program is associated with the temporary channel comprises prompting a viewer at each station in the set of subscriber stations as to whether the viewer desires to switch to the temporary channel.

6. The method of claim 1 wherein the second program is a news related program.

7. The method of claim 1 further comprising the steps of:
   (a) stopping transmission of the second program on the second channel upon completion of the second program;
   (b) continuing transmission of the first program on the first channel;
   (c) stopping transmission of the first program on the temporary channel; and
   (d) eliminating the temporary channel.

8. The method of claim 7 wherein stopping the transmission of the first program on the temporary channel comprises informing the set of subscriber stations that the first program is being continued on the first channel.

9. The method of claim 7 wherein stopping the transmission of the first program on the temporary channel comprises informing the set of subscriber stations that the first program will be continued on the first channel in a predetermined amount of time.

10. A method for use in a system for transmitting programs wherein a first program is being transmitted on a first channel to a set of subscriber stations, the method comprising:
    defining a temporary channel;
    beginning transmission of a second program on the temporary channel;
    stopping transmission of the second program on the temporary channel after transmission of at least a portion of the second program; and
    eliminating the temporary channel.

11. The method of claim 10 further comprising informing the set of subscriber stations that the second program is associated with the temporary channel.

12. The method of claim 11 wherein informing the set of subscriber stations that the second program is associated with the temporary channel comprises informing the set of subscriber stations that the second program is beginning on the temporary channel.

13. The method of claim 11 wherein informing the set of subscriber stations that the second program is associated with the temporary channel comprises informing the set of subscriber stations that the second program will start on the temporary channel in a predetermined amount of time.

14. The method of claim 11 wherein informing the set of subscriber stations that the second program is associated with the temporary channel comprises prompting a viewer at each station in the set of subscriber stations as to whether the viewer desires to switch to the temporary channel.

15. The method of claim 10 wherein the second program is a news related program.

16. A system comprising:
    (a) means for beginning transmission of at least a portion of a first program on a first channel;
    (b) means for defining a temporary channel;
    (c) means for discontinuing transmission of the first program on the first channel;
    (d) means for transmitting a second program on the first channel; and
    (d) means for continuing transmission of the first program on the temporary channel.

17. The system of claim 16 wherein the second program comprises information relating to the association of the first program with the temporary channel.

18. The system of claim 16 wherein the second program is a news related program.

19. A system comprising:
    (a) means for transmitting a flint program on a first channel;
    (b) means for defining a temporary channel;
    (c) means for beginning transmission of a second program on the temporary channel;
    (d) means for stopping transmission of the second program on the temporary channel after transmission of at least a portion of the second program; and
    (e) means for eliminating the temporary channel.

20. The system of claim 19 wherein the first program comprises information relating to the association of the second program with the temporary channel.

21. The system of claim 19 wherein the second program is a news related program.

22. A device comprising:
    (a) a memory for storing a user defined profile;
    (b) means for determining how to control a first channel and a temporary channel responsive to the user defined profile.

23. The device of claim 22 wherein the device is a set top box.

24. The device of claim 22 wherein the device is a server.

25. The device of claim 23 further comprising an infrared transmitter.

26. The device of claim 22 wherein the means for determining automatically transfers tuning from a first channel to a temporary channel if the first program is spun-off from the first channel to the temporary channel.

27. The device of claim 22 wherein the means for determining automatically transmits a signal indicating that the temporary channel should be recorded.

28. The device of claim 27 wherein the signal is an infrared signal.

29. The device of claim 22 wherein the means for determining automatically transmits a signal indicating that the first channel should be recorded.

30. The device of claim 29 wherein the signal is an infrared signal.

31. The device of claim 22 wherein the means for determining automatically transmits at least one signal representative of a first channel and a temporary channel whereby the signal is adapted to be displayed in a picture-in-picture format.

* * * * *